United States Patent
Villeneuve

(10) Patent No.: US 10,551,279 B2
(45) Date of Patent: Feb. 4, 2020

(54) SURFACE DEMOLDABILITY PREDICTION MODEL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Bernard Villeneuve, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 440 days.

(21) Appl. No.: 15/128,462

(22) PCT Filed: Feb. 27, 2015

(86) PCT No.: PCT/FR2015/050472
§ 371 (c)(1),
(2) Date: Sep. 23, 2016

(87) PCT Pub. No.: WO2015/145005
PCT Pub. Date: Oct. 1, 2015

(65) Prior Publication Data
US 2017/0115185 A1    Apr. 27, 2017

(30) Foreign Application Priority Data

Mar. 24, 2014 (FR) ...................................... 14 52448

(51) Int. Cl.
*B29C 39/36* (2006.01)
*B29C 45/40* (2006.01)
(Continued)

(52) U.S. Cl.
CPC ......... *G01M 17/02* (2013.01); *B29D 30/0061* (2013.01); *B29D 30/0662* (2013.01);
(Continued)

(58) Field of Classification Search
CPC ... B60C 99/006; B60C 11/12; B60C 11/1218; B60C 1/0016
See application file for complete search history.

(56) References Cited

U.S. PATENT DOCUMENTS

2010/0310807 A1* 12/2010 Daute ...................... C08K 5/09
                                                                   428/36.92
2011/0084423 A1*  4/2011 Korenaga .............. B82Y 10/00
                                                                        264/293
(Continued)

FOREIGN PATENT DOCUMENTS

JP        2012006287 A    1/2012
JP        2012096462 A    5/2012

*Primary Examiner* — Mischita L Henson
*Assistant Examiner* — Christine Y Liao
(74) *Attorney, Agent, or Firm* — Dickinson Wright PLLC

(57) ABSTRACT

The prediction model includes the steps of calculating a surface area $S_1$ of a control mold, measuring the force $F_1$ for demolding from the control mold, determining first and second test specimens with respective surface areas $S_0$, $S'_0$, measuring the force $F_0$ for demolding from the first test specimen, measuring the force $F'_0$ for demolding from the second test specimen, calculating the ratio of $S_0$ and $S'_0$ so as to define a test specimen surface area ratio $R_{se}$, calculating the ratio of the force $F_0$ for demolding from the first test specimen and $F'_0$ for demolding from the second test specimen so as to define a force ratio $R_{fe}$, measuring the molding surface area $S_m$ of a mold to be measured and calculating the force $F_m$ for demolding from the mold to be measured such that $F_m = F_1 \times S_m/S_1 \times R_{fe}/R_{se}$.

5 Claims, 3 Drawing Sheets

(51) Int. Cl.
*G01M 17/02* (2006.01)
*B29D 30/06* (2006.01)
*B29D 30/00* (2006.01)
*B60C 99/00* (2006.01)
B29C 45/57 (2006.01)
B29C 37/00 (2006.01)
B29C 33/00 (2006.01)
B29C 33/42 (2006.01)

(52) U.S. Cl.
CPC ............ *B60C 99/006* (2013.01); *B29C 33/00* (2013.01); *B29C 33/42* (2013.01); *B29C 37/0003* (2013.01); *B29C 45/57* (2013.01); *B29C 2037/90* (2013.01)

(56) References Cited

U.S. PATENT DOCUMENTS

| | | | | |
|---|---|---|---|---|
| 2011/0278769 | A1* | 11/2011 | Ehbing | B29C 33/0061 264/446 |
| 2012/0061882 | A1* | 3/2012 | Furutono | B29C 59/022 264/496 |
| 2014/0017427 | A1* | 1/2014 | Mettlach | C08G 75/23 428/35.7 |

* cited by examiner

SURFACE DEMOLDABILITY PREDICTION MODEL

CROSS-REFERENCE TO RELATED APPLICATION

The present invention claims priority to PCT International Patent Application Serial No. PCT/FR2015/050472 filed Feb. 27, 2015 entitled "Surface Demoldability Prediction Model," which claims the benefit of FR Patent Application Serial No. 1452448 filed Mar. 24, 2014, the entire disclosures of the applications being considered part of the disclosure of this application and hereby incorporated by reference.

BACKGROUND OF THE INVENTION

1. Field of the Invention

The present invention relates to a method for evaluating the force for demolding a tire from a given mold, and more particularly a method for predicting the demoldability of new tread patterns.

2. Related Art

New ranges of tires have to comply with a functional specification based on performance requirements such as adherence, rolling resistance, noise, etc. However, these new ranges also have to have a lowest impact as possible on the cost of manufacturing the tires.

The manufacturing cost comprises the raw materials used, the labor costs for producing the green casings which will make up the tire and also the labor costs for the curing station (time necessary for the vulcanization of the green casing and time necessary for opening the curing mold), and the longer the time necessary for opening the press in which the mold is placed, the less time remains for curing the green casings. In extreme cases, it is impossible to demold the casing after curing.

New tire tread patterns are increasingly complex, thereby increasing the demolding time. Being able to anticipate the demoldability of these new tread patterns prevents a situation in which solutions that are too time-consuming post-curing and are thus too expensive are put on the market. Therefore, there is a need for a predictive tool which would avoid the production of curing molds, the use of which in a plant would not be acceptable from an industrial point of view.

It is possible to produce a curing mold having the new tread pattern and to measure the forces necessary for counteracting the adhesion generated between this curing mold and the green casing during the curing phase. In order to be able to assess the demoldability of new tread patterns, it is possible to produce mold portions with the various tread patterns to be evaluated and to measure, by virtue of a dynamometric axle mounted on each different portion, the forces necessary to overcome the adhesion generated during curing for each solution. However, the major drawback of this solution is that it is necessary to produce the equivalent of a complete mold, this representing a fairly high cost for an exploratory method.

Use can be made of the know-how of operational staff, but this has the consequence that subjective limitations (based on feeling and not on experiments) risk greatly penalizing the definition of new tread patterns and thus having a negative effect on the desired performance requirements.

Patent JP 2012 006 287 discloses a method and a means for assessing, from a portion of tread pattern elements, the forces necessary for the demoldability of tread pattern elements that are more consistent while limiting the cost. That patent describes a method using a "test specimen", or mold specimen, that is representative of a part of the tread pattern chosen in the most restrictive region of the complete mold, and the forces necessary for overcoming the adhesion generated on the test specimen are measured in order then to transpose it to larger parts.

However, the adhesion of the green casing to the mold which arises during the curing phase is dependent on a large number of parameters which are difficult to assess as a whole. If the geometric aspect of the tread pattern: dimensions and intrusive geometry, is partially taken into account in this prior art, it is necessary to produce a new mold specimen upon changing the molding surface area of the mold, because a tread pattern is dimensionally adapted to a given vehicle panel or because the tread pattern is changed.

Specifically, it is found that, with the tread pattern and material remaining the same, the dimensional adaptation has a non-negligible impact on the surface area in contact between the casing to be cured and the curing mold. This variation will have a direct impact on the forces associated with adhesion.

From experience, with the material and tread pattern remaining the same, the forces associated with adhesion do not change in the same proportions as the surface area in contact changes. Thus, on doubling the surface area in contact, the forces associated with adhesion are not doubled.

One solution consists in producing several curing molds for different tire sizes of a single range and in measuring the forces associated with adhesion. Without producing all the sizes, it would then be possible to define a law of change in the demolding forces for a given range. However, this method requires the production of several molds, and this can quickly become very expensive.

SUMMARY OF THE INVENTION AND ADVANTAGES

The object of the present disclosure is to propose a solution that is both simple and precise, analytically assessing the impact of surface area on adhesion post-curing in order, by way of measurements carried out on test specimens, to evaluate the demoldability of new sizes.

The method for evaluating a force for demolding a tire from a mold according to the disclosure consists in measuring a force for demolding from and a molding surface area of a control mold and two test specimens, said method including:
- a step of choosing the control mold,
- a step of calculating the molding surface area $S_1$ of the control mold,
- a step of measuring the force $F_1$ for demolding from the control mold,
- a step of determining a first control test specimen with a molding surface area $S_0$,
- a step of determining a second control test specimen with a molding surface area $S'_0$, $S'_0$ being different from $S_0$,
- a step of measuring the force $F_0$ for demolding from the first control test specimen,
- a step of measuring the force $F'_0$ for demolding from the second control test specimen,
- a step of calculating the ratio of the molding surface area $S_0$ of the first test specimen and $S'_0$ of the second test specimen so as to define a test specimen surface area ratio $R_{se}$, a step of calculating the ratio of the force $F_0$ for demolding from the first test specimen and $F'_0$ for demolding from the second test specimen so as to define a test specimen force ratio $R_{fe}$, a step of selecting a mold to be measured, a step of calculating the molding surface area $S_m$ of the mold to be measured, a step of calculating the force $F_m$ for demolding from the mold to be measured such that $F_m = F_1 \times S_m/S_1 \times R_{fe}/R_{se}$.

"Molding surface area" is the name given to the surface area in contact between the mold and the tire casing.

During the development of a new tread pattern, a control tire size will be chosen to produce test casings, for example that of the particular vehicle. This control size will serve to determine a control mold. Actual force measurements will be taken while these tires are being manufactured from this control mold. With the dimensional scope of the range being known, it is possible to use a CAD tool to measure, for each tire size, the surface area of contact between the casing and the mold. The test specimens are used analytically to define, for a given material, a law of change in the forces associated with adhesion with respect to the surface area in contact. This law of change then makes it possible to extrapolate the measurements of known forces for the size of test casings for other sizes in the range. The determination of a "coefficient of surface demoldability" makes it possible to extrapolate the capacity for demoldability from the corresponding new mold for another size in the range. The measurements are taken with a reference material.

According to one particular feature, the molding surface area $S'_0$ of the second test specimen is greater than the molding surface area $S_0$ of the first test specimen. The first test specimen will then be the reference test specimen from which the demolding forces will be calculated.

In an additional manner, the method comprises:

a step of determining the force $M_0$ for demolding the reference material from a material test specimen, a step of selecting a material to be measured, a step of determining the force M for demolding the material from the material test specimen, a step of calculating the ratio of the forces $M_0$ for demolding the reference material and M for demolding the material from the material test specimen so as to define a coefficient C of material impact, a step of calculating the force F for demolding the material such that $F = C \times F_0$.

The material test specimen will have a very simple shape.

It is thus possible to take into account the material parameter and thus to measure the material impact on demolding.

The disclosure also relates to a device for selecting the molding surface area of a mold, which comprises a control mold, a first and a second test specimen, a force measuring device and a calculating means, and which uses a method having at least one of the above features. The control test specimens have a relatively simple shape but with different contact surface areas.

The subject of the disclosure is also a computer program for selecting the molding surface area of a mold, which comprises the following instructions:

a step of choosing the control mold, a step of measuring the force $F_1$ for demolding from the control mold, a step of calculating the molding surface area $S_1$ of the control mold, a step of determining a first control test specimen with a molding surface area $S_0$, a step of determining a second control test specimen with a molding surface area $S'_0$, $S'_0$ being different from $S_0$, a step of measuring the force $F_0$ for from demolding from the first control test specimen, a step of measuring the force $F'_0$ for demolding from the second control test specimen, a step of calculating the ratio of the molding surface area $S_0$ of the first test specimen and $S'_0$ of the second test specimen so as to define a test specimen surface area ratio $R_{se}$, a step of calculating the ratio of the force $F'_0$ for demolding from the first test specimen and $F'_0$ for demolding from the second test specimen so as to define a test specimen force ratio $R_{fe}$, a step of selecting a mold to be measured, a step of calculating the molding surface area $S_m$ of the mold to be measured, a step of calculating the force $F_m$ for demolding from the mold to be measured such that $F_m = F_1 \times S_m/S_1 \times R_{fe}/R_{se}$.

BRIEF DESCRIPTION OF THE DRAWINGS

Further advantages may also become apparent to a person skilled in the art from reading the following examples, which are illustrated by the appended figures and given by way of example.

DETAILED DESCRIPTION OF THE ENABLING EMBODIMENT

Figure 1:
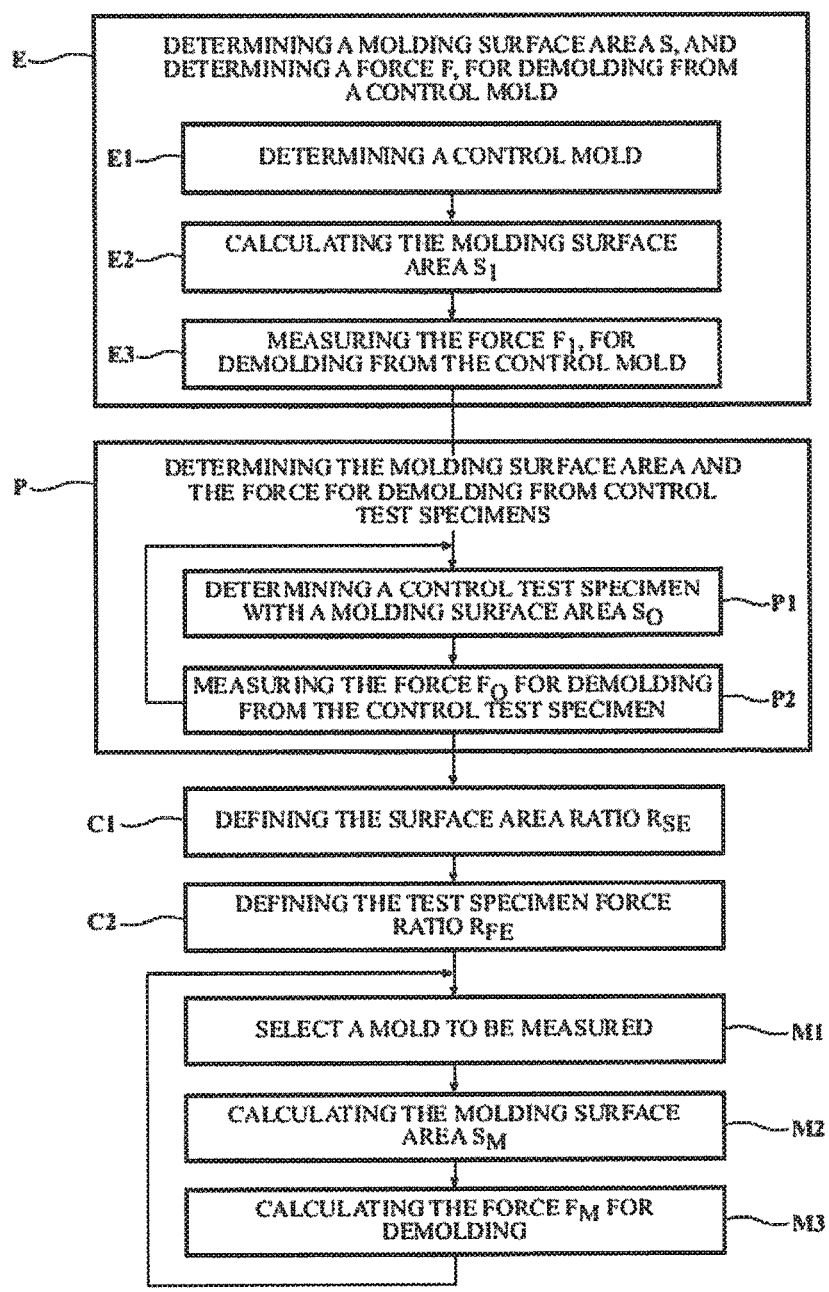
FIG. 1 shows a flowchart of the steps in the method for evaluating the force for demolding a tire according to the disclosure.

FIG. 1 shows a flowchart of the steps in the method for evaluating the force for demolding a tire from a mold.

The method includes a step E of determining the molding surface area $S_1$ and of determining the force $F_1$ for demolding from a control mold. This step E comprises a substep E1 of determining a control mold, a substep E2 of calculating the molding surface area $S_1$, a substep E3 of measuring the force $F_1$ for demolding from the control mold.

The method includes a second step P of determining the molding surface area and the force for demolding from control test specimens. This step is split up into a substep P1 of determining a control test specimen with a molding surface area $S_0$, a substep P2 of measuring the force $F_0$ for demolding from the control test specimen. This step P requires a second measurement in order to determine the force $F'_0$ for demolding from a second test specimen with a molding surface area $S'_0$.

The method then includes a first step C1 of defining the surface area ratio $R_{se}$ by calculating the ratio of the molding surface area $S_0$ of the first test specimen and $S'_0$ of the second test specimen so as to define a test specimen surface area ratio $R_{se}$ and a second step C2 of defining the test specimen force ratio $R_{fe}$ by calculating the ratio of the force $F'_0$ for demolding from the first test specimen and $F'_0$ for demolding from the second test specimen so as to define a test specimen force ratio $R_{fe}$.

Next, in a step M1, a mold to be measured is selected, followed by a step M2 of calculating the molding surface area $S_m$ of the mold to be measured, and a step M3 of calculating the force $F_m$ for demolding from the mold to be measured such that $F_m = F_1 \times S_m/S_1 \times R_{fe}/R_{se}$.

Figure 2:
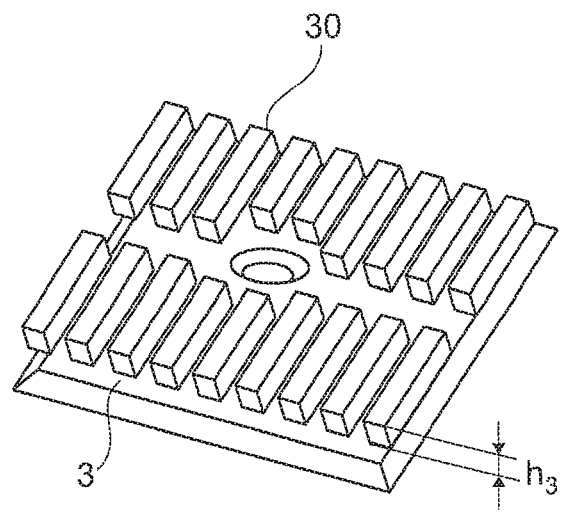
FIGS. 2 and 3 are perspective views of a first and a second test specimen, FIG. 4 a selection device according to the disclosure.
Figure 3:
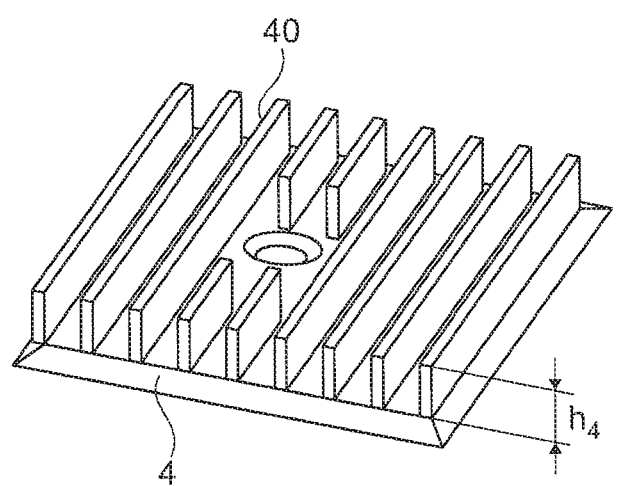

The test specimens could, for example, have a profile as illustrated in FIGS. 2 and 3. The test specimen 3 illustrated in FIG. 2 has relatively simple grooves 30, in this case rectilinear and parallel, with a depth $h_3$, and the test specimen 4 illustrated in FIG. 3 has grooves 40 with a depth $h_4$ greater than $h_3$. The molding surface area of the test specimen 4 is thus greater than the molding surface area of the test specimen 3. These test specimens have only horizontal and vertical surfaces since the objective is to measure the surface impact, not the geometric impact. In addition, these test specimens should make it possible to measure the tensile forces generated by the profiles of the tire and shear forces generated by the ribs or grooves. The surface impact is obtained using two test specimens 3 and 4, the surface area in contact of each of which is known exactly. The differences measured between the forces for demolding from each test specimen 3 and 4 make it possible to correlate the forces with the surface impact. The measurements are taken with the same materials as those used to manufacture test casings and with the control mold.

The following table shows examples of values for force and molding surface areas of two test specimens.

| Surface area analysis test specimens | test specimen 3 | test specimen 4 |
|---|---|---|
| Surface demolding forces (in daN) | 410 | 445 |
| Test specimen surface area (in mm$^2$) | 25 504 | 31 883 |
| Test specimen surface area ratio ($R_{se}$) | 1 | 1.250 |
| Test specimen force ratio ($R_{fe}$) | 1 | 1.085 |

For this example, this means that, for a given compound, an additional 25% of surface area in contact (of test specimen 4 compared with test specimen 3) generates an additional 8.5% of demolding force.

Using the method, the surface area in contact of the control mold 2 and different mould variants 8 to be measured will be measured and the surface area ratio between the control mold 2 and the variants to be evaluated: mold 81 and mold 82, will be calculated.

|  | Dimension control mold | Dim mold 81 | Dim mold 82 |
|---|---|---|---|
| Molding surface area (in mm$^2$) | 531 525 | 657 997 | 779 559 |
| Mold surface area ratio | 1 | 1.238 | 1.467 |

Proceeding from the law of change in the surface impact forces, 25% of the surface area in contact generates an additional 8.5% of demolding forces, and from the above mold surface area ratios, we can determine the coefficient of surface demoldability in accordance with the following formula:

Coefficient of surface demoldability=(mold surface area ratio/$R_{se}$)×$R_{fe}$ In other words, in the above example:

Coefficient of surface demoldability=(mold surface area ratio/1.250)×1.085, i.e.

|  | Dim mold 81 | Dim mold 82 |
|---|---|---|
| Coefficient of surface demoldability | 1.075 | 1.273 |

In the above example, we can see that, for the mold 82, the surface area in contact is increased by 46.7% compared with the control mold and that the forces induced are greater by 27.3%.

Proceeding from the coefficient of surface demoldability and from the measurement of the forces of a test or control mold, it is possible to assess the demolding forces for a new size. This analysis thus makes it easier to define the production means to be employed (type and power of the curing press, coating, etc.) in order to ensure the manufacture of each size of a range of tires. For each new range, a new control casing and thus a control mold is chosen and it is possible to recalculate the demolding forces for the entire range.

Figure 5:
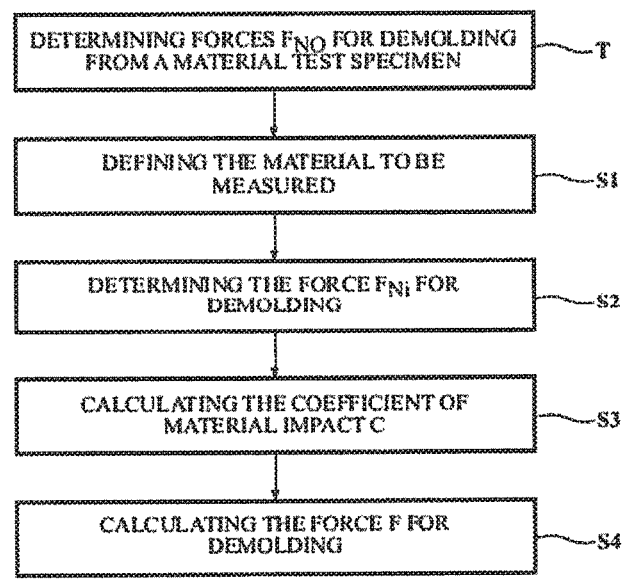
FIG. 5 shows a flowchart of additional steps of the method.

FIG. 5 shows a flowchart of the additional steps in the method in order to take account of the material used.

The additional method includes a step T of determining, for a given reference material (in this case the one used in the preceding steps), forces $F_{no}$ for demolding from a material test specimen. The method comprises a second step S1 of defining the material to be measured, followed by a step S2 of determining the force $F_{ni}$ for demolding said material from the material test specimen.

The following step S3 consists in calculating the coefficient of material impact C of the material to be measured, this coefficient C being the ratio of the forces $F_{no}$ for demolding the reference material and $F_{ni}$ for demolding the material from the material test specimen:

$C = F_{ni}/F_{no}$.

Next, step S4 is the calculation of the force F for demolding the material to be measured from the control mold such that $F = C \times F_0$.

For each new material to be measured, all that will be necessary is to define its coefficient of material impact by repeating the method from step S1.

Figure 4:
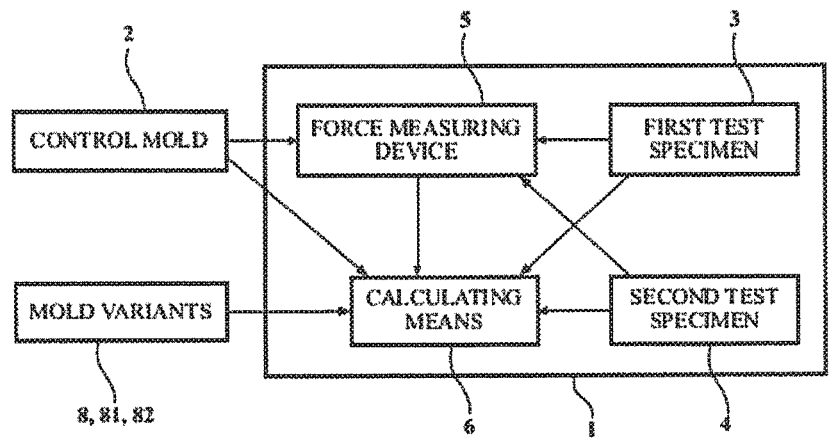

The device 1 illustrated in FIG. 4 comprises a first test specimen 3, a second test specimen 4, a force measuring device 5, and a calculating means 6. Starting from the two test specimens 3 and 4, the device 1 will be used to calculate the molding surface area $S_0$ of the first test specimen 3, the molding surface area $S'_0$ of the second test specimen 4, to measure the force $F_0$ for demolding from the first test specimen 3 and the force $F'_0$ for demolding from the second test specimen 4, and then it will calculate the ratio of the molding surface area $S_0$ of the first test specimen 3 and $S'_0$ of the second test specimen 4 so as to define a test specimen surface area ratio $R_{se}$, and the ratio of the force $F'_0$ for demolding from the first test specimen 3 and $F'_0$ for demolding from the second test specimen 4 so as to define a test specimen force ratio $R_{fe}$. The calculating means 6 of the device 1 will also calculate the surface area $S_1$ of a control mold 2 and the force measuring device 5 will measure the force $F_1$ for demolding from said control mold 2. When the force $F_m$ for demolding from a mold 8 to be measured needs to be known, all that will be necessary is to calculate the molding surface area $S_m$ of the mold 8 so as to obtain the force $F_m$ for demolding from said mold 8 such that $F_m = F_1 \times S_m/S_1 \times R_{fe}/R_{se}$.

What is claimed is:

1. A method for evaluating a force for demolding a tire from a mold, consisting of measuring a force for demolding from and a molding surface area of a control mold, said method including the steps of:
   choosing the control mold,
   calculating the molding surface area $S_1$ of the control mold, measuring the force $F_1$ for demolding from the control mold, determining a first control test specimen with a molding surface area $S_0$, determining a second control test specimen with a molding surface area $S'_0$, $S'_0$ being different from $S_0$, measuring the force $F_0$ for demolding from the first control test specimen, measuring the force $F'_0$ for demolding from the second control test specimen, calculating the ratio of the molding surface area $S_0$ of the first test specimen and $S'_0$ of the second test specimen so as to define a test specimen surface area ratio $R_{se}$, calculating the ratio of the force $F_0$ for demolding from the first test specimen and $F'_0$ for demolding from the second test specimen so as to define a test specimen force ratio $R_{fe}$, a step of selecting a mold to be measured, a step of calculating the molding surface area $S_m$ of the mold to be measured, calculating the force $F_m$ for demolding from the mold to be measured such that $F_m = F_1 \times S_m/S_1 \times R_{fe}/R_{se}$; and demolding a tire from the mold based on the calculated force $F_m$.

2. The method according to claim 1, wherein the molding surface area $S'_0$ of the second test specimen is greater than the molding surface area $S_0$ of the first test specimen.

3. The method according to claim 1, further including the steps of:

determining the force $M_0$ for demolding the reference material from a material test specimen, selecting a material to be measured, determining the force M for demolding the material from the material test specimen, calculating the ratio of the forces $M_0$ for demolding the reference material and M for demolding the material from the material test specimen so as to define a coefficient C of material impact, calculating the force F for demolding the material such that $F = C \times F_0$.

4. A device for selecting the molding surface area of a molding comprising a control mold according to the method of claim 1, wherein the device comprises a first and a second test specimen, a force measuring device and a calculating means for calculating the calculating steps in the method according to claim 1.

5. A computer program for selecting the molding surface area of a mold, wherein the computer program comprises the following instructions:

a step of choosing the control mold, a step of calculating the molding surface area $S_1$ of the control mold, a step of measuring the force $F_1$ for demolding from the control mold, a step of determining a first control test specimen with a molding surface area $S_0$, a step of determining a second control test specimen with a molding surface area $S'_0$, $S'_0$ being different from $S_0$, a step of measuring the force $F_0$ for demolding from the first control test specimen, a step of measuring the force $F'_0$ for demolding from the second control test specimen, a step of calculating the ratio of the molding surface area $S_0$ of the first test specimen and $S'_0$ of the second test specimen so as to define a test specimen surface area ratio $R_{se}$, a step of calculating the ratio of the force $F'_0$ for demolding from the first test specimen and $F'_0$ for demolding from the second test specimen so as to define a test specimen force ratio $R_{fe}$, a step of selecting a mold to be measured, a step of calculating the molding surface area $S_m$ of the mold to be measured, a step of calculating the force $F_m$ for demolding from the mold to be measured such that $F_m = F_1 \times S_m/S_1 \times R_{fe}/R_{se}$ and demolding a tire from the mold based on the calculated force $F_m$.

* * * * *